US008676131B2

(12) United States Patent
Proctor, Jr. et al.

(10) Patent No.: US 8,676,131 B2
(45) Date of Patent: Mar. 18, 2014

(54) METHOD AND APPARATUS FOR ALLOWING SOFT HANDOFF OF A CDMA REVERSE LINK UTILIZING AN ORTHOGONAL CHANNEL STRUCTURE

(75) Inventors: James A. Proctor, Jr., Melbourne Beach, FL (US); Pertti O. Alapuranen, Indialantic, FL (US)

(73) Assignee: IPR Licensing, Inc., Wilmington, DE (US)

( * ) Notice: Subject to any disclaimer, the term of this patent is extended or adjusted under 35 U.S.C. 154(b) by 4 days.

(21) Appl. No.: 13/069,174

(22) Filed: Mar. 22, 2011
(Under 37 CFR 1.47)

(65) Prior Publication Data
US 2011/0170467 A1    Jul. 14, 2011

Related U.S. Application Data

(63) Continuation of application No. 10/717,995, filed on Nov. 20, 2003, now Pat. No. 7,911,993, which is a continuation-in-part of application No. 09/898,514, filed on Jul. 3, 2001, now Pat. No. 7,006,428.

(60) Provisional application No. 60/427,847, filed on Nov. 20, 2002, provisional application No. 60/219,789, filed on Jul. 19, 2000.

(51) Int. Cl.
*H04B 1/00*    (2006.01)

(52) U.S. Cl.
USPC .............. 455/69; 455/522; 455/442; 455/574; 370/331; 370/335

(58) Field of Classification Search
USPC .............. 455/436, 522, 68–69, 515, 524, 525, 455/561, 442; 370/330–334, 335
See application file for complete search history.

(56) References Cited

U.S. PATENT DOCUMENTS

| 4,460,992 A | 7/1984 | Gutleber |
| 5,056,109 A * | 10/1991 | Gilhousen et al. ............ 370/342 |

(Continued)

FOREIGN PATENT DOCUMENTS

| JP | 10-028077 | 1/1998 |
| JP | 2000-278759 | 10/2000 |

(Continued)

OTHER PUBLICATIONS

Third Generation Partnership Project, "Technical Specification Group Radio Access Network; Medium Access Control (MAC) protocol specification (Release 5)," 3GPP TS 25.321 V5.6.0 (Sep. 2003).

(Continued)

*Primary Examiner* — Sharad Rampuria
(74) *Attorney, Agent, or Firm* — Volpe and Koenig, P.C.

(57) ABSTRACT

Method and apparatus for base stations and subscriber units allows soft handoff of a CDMA reverse link utilizing an orthogonal channel structure. Subscriber units transmit an orthogonally coded signal over a reverse link to the base stations. A given base station provides timing control of the timing offset of the reverse link signal. Based on at least one criterion, an alignment controller determines that the given base station should hand off timing control to another base station, and a soft handoff process ensues. In response to a command or message for soft handoff of the subscriber unit from the given base station to another base station, the subscriber unit makes a coarse timing adjustment to the timing of the coded signal. The subscriber unit may make fine timing adjustments based on feedback from the base station controlling timing. Multiple base stations may provide power control feedback to the subscriber unit.

6 Claims, 13 Drawing Sheets

(56) References Cited

U.S. PATENT DOCUMENTS

| | | | |
|---|---|---|---|
| 5,101,501 A * | 3/1992 | Gilhousen et al. | 455/442 |
| 5,103,459 A * | 4/1992 | Gilhousen et al. | 370/206 |
| 5,267,261 A * | 11/1993 | Blakeney et al. | 370/332 |
| 5,404,376 A | 4/1995 | Dent | |
| 5,414,728 A | 5/1995 | Zehavi | |
| 5,416,797 A | 5/1995 | Gilhousen et al. | |
| 5,617,410 A | 4/1997 | Matsumoto | |
| 5,870,427 A | 2/1999 | Tiedemann et al. | |
| 5,930,244 A | 7/1999 | Ariyoshi et al. | |
| 5,937,019 A | 8/1999 | Padovani | |
| 5,983,113 A | 11/1999 | Asanuma | |
| 6,044,074 A | 3/2000 | Zehavi et al. | |
| 6,085,108 A | 7/2000 | Knutsson et al. | |
| 6,091,760 A | 7/2000 | Giallorenzi et al. | |
| 6,094,421 A | 7/2000 | Scott | |
| 6,097,715 A | 8/2000 | Ichihara | |
| 6,144,651 A | 11/2000 | Rinchiuso et al. | |
| 6,181,919 B1 * | 1/2001 | Ozluturk | 455/69 |
| 6,240,292 B1 | 5/2001 | Haberman et al. | |
| 6,249,517 B1 | 6/2001 | Roh et al. | |
| 6,266,363 B1 | 7/2001 | Hiramatsu | |
| 6,324,160 B1 | 11/2001 | Martin et al. | |
| 6,324,401 B1 | 11/2001 | De Hoz Garcia-Bellido et al. | |
| 6,332,008 B1 | 12/2001 | Giallorenzi et al. | |
| 6,377,814 B1 | 4/2002 | Bender | |
| 6,396,867 B1 * | 5/2002 | Tiedemann et al. | 375/141 |
| 6,421,334 B1 | 7/2002 | Baines | |
| 6,438,377 B1 | 8/2002 | Savolainen | |
| 6,456,612 B1 | 9/2002 | Kim et al. | |
| 6,463,074 B1 | 10/2002 | Johnson et al. | |
| 6,470,001 B1 | 10/2002 | Kim et al. | |
| 6,529,741 B1 * | 3/2003 | Tong et al. | 455/522 |
| 6,563,808 B1 | 5/2003 | Cox et al. | |
| 6,574,211 B2 * | 6/2003 | Padovani et al. | 370/347 |
| 6,590,889 B1 | 7/2003 | Preuss et al. | |
| 6,621,804 B1 * | 9/2003 | Holtzman et al. | 370/329 |
| 6,665,287 B1 | 12/2003 | Katsura et al. | |
| 6,747,963 B1 | 6/2004 | Park et al. | |
| 6,760,587 B2 * | 7/2004 | Holtzman et al. | 455/436 |
| 6,917,581 B2 | 7/2005 | Proctor, Jr. et al. | |
| 7,006,428 B2 | 2/2006 | Proctor et al. | |
| 7,116,646 B1 | 10/2006 | Gustafson et al. | |
| 7,272,163 B2 | 9/2007 | Hao et al. | |
| 7,620,097 B2 * | 11/2009 | Heidari et al. | 375/148 |
| 7,729,714 B2 * | 6/2010 | Black et al. | 455/522 |
| 7,852,746 B2 * | 12/2010 | Jalali | 370/208 |
| 8,285,318 B2 * | 10/2012 | Chen et al. | 455/522 |
| 2002/0009068 A1 | 1/2002 | Proctor et al. | |
| 2002/0071384 A1 | 6/2002 | Hall et al. | |
| 2002/0086693 A1 * | 7/2002 | Ahmad et al. | 455/522 |
| 2003/0002460 A1 * | 1/2003 | English | 370/331 |
| 2003/0128658 A1 | 7/2003 | Walton et al. | |
| 2003/0214932 A1 | 11/2003 | Ariyoshi et al. | |
| 2004/0151141 A1 | 8/2004 | Proctor et al. | |
| 2004/0203991 A1 * | 10/2004 | Chen et al. | 455/522 |
| 2004/0257975 A1 | 12/2004 | Proctor | |
| 2005/0054366 A1 | 3/2005 | Chen et al. | |
| 2005/0111397 A1 * | 5/2005 | Attar et al. | 370/319 |
| 2005/0220051 A1 | 10/2005 | Lavean | |
| 2006/0140157 A1 | 6/2006 | Proctor et al. | |
| 2007/0076583 A1 | 4/2007 | Hadad | |
| 2010/0322160 A1 * | 12/2010 | Yeh et al. | 370/329 |

FOREIGN PATENT DOCUMENTS

| | | |
|---|---|---|
| JP | 2000-286784 | 10/2000 |
| JP | 2001-016159 | 1/2001 |
| JP | 2001-358638 | 12/2001 |
| WO | 99/01994 | 1/1994 |
| WO | 01/24411 | 5/2001 |
| WO | 01/95521 | 12/2001 |
| WO | 02/09320 | 1/2002 |
| WO | 2004/046893 | 6/2004 |

OTHER PUBLICATIONS

Nee Van R D J: "Timing Aspects of Synchronous CDMA" IEEE International Symposium on Personal, Indoor and Mobile Radio Communications, 1994, pp. 439-443, XP000619815, * p. 439-p. 440**.

Third Generation Partnership Project, "Technical Specification Group Radio Access Network; Physical channels and mapping of transport channels only physical channels (FDD) (Release 5)," 3GPP TS 25.211 V5.2.0 (Sep. 2002).

Chen, "Simultaneous Multiple Packet Capture Based on SIR Levels and Arrival Delay Offsets in CDMA Packet Networks," IEEE Transactions on Vehicular Technology, vol. 51, Issue 6 (Nov. 2002).

Cheun, "Optimum Arrival-Time Distribution for Delay Capture in Spread-Spectrum Packet Radio Networks," IEEE Transactions on Vehicular Technology, vol. 46, Issue 4 (Nov. 1997).

Nee Van R D J: "Timing Aspects of Synchronous CDMA" IEEE International Symposium on Personal, Indoor and Mobile Radio Communications, 1994, pp. 439-443, XP000619815, *p. 439-p. 440**.

Soft Handoff and Power Control in IS-95 CDMA; CDMA 95.10; Chapter 10; p. 181, (Dec. 6, 1999).

Third Generation Partnership Project, "Technical Specification Group Radio Access Network; MAC protocol specification (Release 1999)," 3GPP TS 25.321 V3.13.0 (Sep. 2002).

Third Generation Partnership Project, "Technical Specification Group Radio Access Network; Medium Access Control (MAC) protocol specification (Release 1999)," 3GPP TS 25.321 V3.16.0 (Sep. 2003).

Third Generation Partnership Project, "Technical Specification Group Radio Access Network; MAC protocol specification (Release 4)," 3GPP TS 25.321 V4.6.0 (Sep. 2002).

Third Generation Partnership Project, "Technical Specification Group Radio Access Network; Medium Access Control (MAC) protocol specification (Release 4)," 3GPP TS 25.321 V4.9.0 (Sep. 2003).

Third Generation Partnership Project, "Technical Specification Group Radio Access Network; MAC protocol specification (Release 5)," 3GPP TS 25.321 V5.2.0 (Sep. 2002).

Third Generation Partnership Project, "Technical Specification Group Radio Access Network; Medium Access Control (MAC) protocol specification(Release 5)," 3GPP TS 25.321 V5.6.0 (Sep. 2003).

Third Generation Partnership Project, "Technical Specification Group Radio Access Network; Physical channels and mapping of transport channels onto physical channels (FDD) (Release 1999)," 3GPP TS 25.211 V3.12.0 (Sep. 2002).

Third Generation Partnership Project, "Technical Specification Group Radio Access Network; Physical channels and mapping of transport channels onto physical channels (FDD) (Release 4)," 3GPP TS 25.211 V4.6.0 (Sep. 2002).

Third Generation Partnership Project, "Technical Specification Group Radio Access Network; Physical channels and mapping of transport channels onto physical channels (FDD) (Release 5)," 3GPP TS 25.211 V5.2.0 (Sep. 2002).

Third Generation Partnership Project, "Technical Specification Group Radio Access Network; Physical channels and mapping of transport channels onto physical channels (FDD) (Release 5)," 3GPP TS 25.211 V5.5.0 (Sep. 2003).

Third Generation Partnership Project, "Technical Specification Group Radio Access Network; Spreading and modulation (FDD) (Release 1999)," 3GPP TS 25.213 V3.8.0 (Jun. 2002).

Third Generation Partnership Project, "Technical Specification Group Radio Access Network; Spreading and modulation (FDD) (Release 4)," 3G TS 25.213 V4.3.0 (Jun. 2002).

Third Generation Partnership Project, "Technical Specification Group Radio Access Network; Spreading and modulation (FDD) (Release 5)," 3GPP TS 25.213 V5.4.0 (Sep. 2003).

Third Generation Partnership Project, "Technical Specification Group Radio Access Network; Spreading and modulation (FDD) (Release 5)," 3GPP TS 25.213 V5.2.0 (Sep. 2002).

(56) References Cited

OTHER PUBLICATIONS

Third Generation Partnership Project, "Technical Specification Group Radio Access Network; Packet Data Convergence Protocol (PDCP) Specification (Release 1999)," 3GPP TS 25.323 V3.10.0 (Sep. 2002).

Third Generation Partnership Project, "Technical Specification Group Radio Access Network; Packet Data Convergence Protocol (PDCP) Specification (Release 4)," 3GPP TS 25.323 V4.6.0 (Sep. 2002).

Third Generation Partnership Project, "Technical Specification Group Radio Access Network; Packet Data Convergence Protocol (PDCP) Specification (Release 5)," 3GPP TS 25.323 V5.2.0 (Sep. 2002).

Third Generation Partnership Project, "Technical Specification Group Radio Access Network; Physical layer procedures (FDD) (Release 1999)," 3GPP TS 25.214 V3.11.0 (Sep. 2002).

Third Generation Partnership Project, "Technical Specification Group Radio Access Network; Physical layer procedures (FDD) (Release 1999)," 3GPP TS 25.214 V3.12.0 (Mar. 2003).

Third Generation Partnership Project, "Technical Specification Group Radio Access Network; Physical layer procedures (FDD) (Release 4)," 3GPP TS 25.214 V4.5.0 (Sep. 2002).

Third Generation Partnership Project, "Technical Specification Group Radio Access Network; Physical layer procedures (FDD) (Release 4)," 3GPP TS 25.214 V4.6.0 (Mar. 2003).

Third Generation Partnership Project, "Technical Specification Group Radio Access Network; Physical layer procedures (FDD) (Release 5)," 3GPP TS 25.214 V5.2.0 (Sep. 2002).

Third Generation Partnership Project, "Technical Specification Group Radio Access Network; Physical layer procedures (FDD) (Release 5)," 3GPP TS 25.214 V5.6.0 (Sep. 2003).

Cheun, "Optimum Arrival-Time Distribution for Delay Capture in Spread-Spectrum Packet Radio Networks,"IEEE Transactions on Vehicular Technology, vol. 45, Issue 4 (Nov. 1997).

Ericsson, "Updated text proposal for TR 25.896: Fast DCH Setup Mechanisms," TSG-RAN WG1 #31, R1-030210 (Feb. 18-21, 2003).

LG Electronics Inc., "On consideration of synchronization indicator for reduction in uplink synchronization time in Fast DCH Setup," TSG-RAN WG1 #32, R1-030495 (May 19-23, 2003).

\* cited by examiner

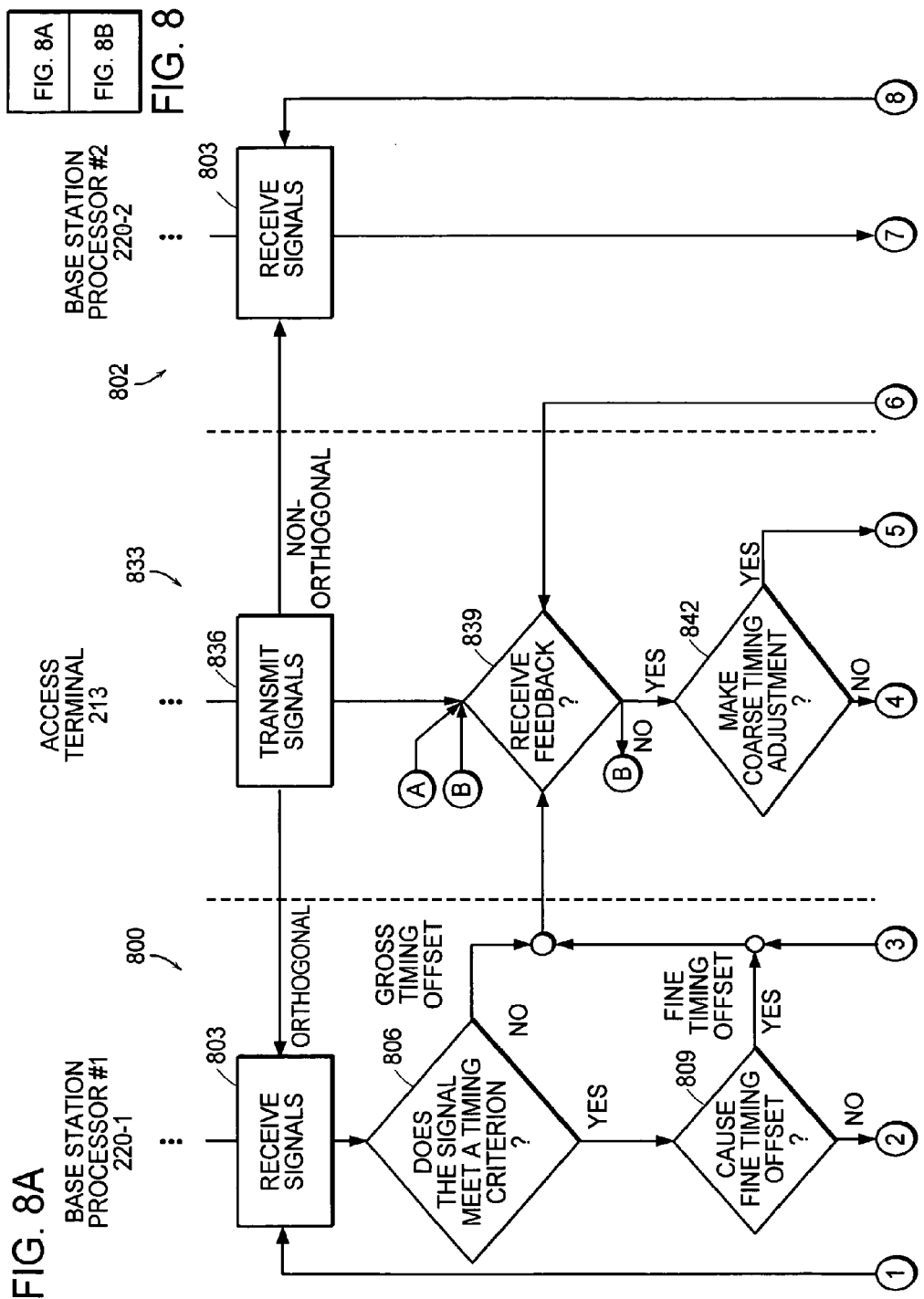

METHOD AND APPARATUS FOR ALLOWING SOFT HANDOFF OF A CDMA REVERSE LINK UTILIZING AN ORTHOGONAL CHANNEL STRUCTURE

CROSS REFERENCE TO RELATED APPLICATIONS

This application is a continuation of U.S. patent application Ser. No. 10/717,995, filed on Nov. 20, 2003, which claims the priority benefit of U.S. Provisional Application No. 60/427,847, filed on Nov. 20, 2002, and which is a Continuation-in-Part of U.S. application Ser. No. 09/898,514, filed Jul. 3, 2001, which in turn claims priority to U.S. Provisional Application No. 60/219,789, filed Jul. 19, 2000. The entire teachings of the above applications are incorporated herein by reference.

BACKGROUND

The last twenty years have seen unprecedented growth in both the type and demand for wireless communication services. Wireless voice communication services, including cellular telephone, Personal Communication Services (PCS), and similar systems now provide nearly ubiquitous coverage. The infrastructure for such networks has been built-out to the point where most residents of the United States, Europe, and other industrialized regions of the world have not just one, but multiple service providers from which to choose.

Continued growth in the electronics and computer industries increasingly contributes to demand for access to the Internet and the myriad of services and features that it provides. This proliferation in the use of computing equipment, especially that of the portable variety, including laptop computers, handheld Personal Digital Assistants (PDAs), Internet-enabled cellular telephones and like devices, has resulted in a corresponding increase in the need for wireless data access.

While the cellular telephone and PCS networks are widely deployed, these systems were not originally intended for carrying data traffic. Instead, these networks were designed to efficiently support continuous analog signals as compared to the burst mode digital communication protocols needed for Internet communications. Consider also that voice communication is adequate with a communication channel bandwidth of approximately 3 kilohertz (kHz). However, it is generally accepted that for effective Internet communication, such as for Web browsing, a data rate of at least 56 kilobits per second (kbps) or higher is required.

In addition, the very nature of the data traffic itself is different from the nature of voice communication. Voice requires a continuous duplex connection; that is, the user at one end of a connection expects to be able to transmit and receive to the user at the other end of a connection continuously, while at the same time the user at the other end is also able to transmit and receive. However, access to Web pages over the Internet is, in general, very burst oriented. Typically, the user of a remote client computer specifies the address of computer files such as on a Web server. This request is then formatted as a relatively short data message, typically less than a 1000 bytes in length. The other end of the connection, such as at a Web server in the network, then replies with the requested data file which may be from 10 kilobytes to several megabytes of text, image, audio, or video data. Because of delays inherent in the Internet itself, users often expect delays of at least several seconds or more before the requested content begins to be delivered to them. And then once that content is delivered, the user may spend several seconds or even minutes reviewing, reading the contents of the page before specifying the next page to be downloaded.

Furthermore, voice networks were built to support high mobility usage; that is, extreme lengths were taken to support highway speed type mobility to maintain connections as the users of voice based cellular and PCS networks travel at high speeds along a highway. However, the typical user of a laptop computer is relatively stationary, such as sitting at a desk. Thus, the cell-to-cell high speed mobility considered critical for wireless voice networks is typically not required for supporting data access.

SUMMARY

It would make sense to retrofit certain components of the existing wireless infrastructure to more efficiently accommodate wireless data. The additional functionality implemented for a new class of users who are high data rate but low mobility users should be backwards compatible with existing functionality for users who are low data rate, high mobility. This would permit using the same frequency allocation plans, base station antenna, build out sites, and other aspects of the existing voice network infrastructure to be used to provide the new high speed data service.

It would be particularly important to support as high a data rate as possible on the reverse link of such a network that is carrying data on the reverse link, e.g., from the remote unit to the base station. Consider that existing digital cellular standards such as the IS-95 Code Division Multiple Access (CDMA) specify the use of different code sequences in a forward link direction in order to maintain minimum interference between channels. Specifically, such a system employs orthogonal codes on the forward link, which defines individual logical channels. However, the optimum operation of such a system requires all such codes to be time aligned to a specific boundary to maintain orthogonality at the receiver. Therefore, the transmissions must be synchronized.

This is not a particular concern in a forward link direction since all transmissions originate at the same location, i.e., at a base transceiver station location. However, currently, digital cellular CDMA standards do not attempt to use or require orthogonality between channels in a reverse link direction. It is generally assumed that it is too difficult to synchronize transmissions originating from remote units located in different locations and at potentially quite different distances from the base station. Instead, these systems typically use a chip level scrambling code with unique shifts of this long pseudo-random code to distinguish the individual reverse link channels. Use of this scrambling, however, thus precludes the possibility of different users' transmissions being orthogonal to one another.

Accordingly, one embodiment of the present invention includes a system that supports communication among members of a first group of users and a second group of users. The first group of users, which may be legacy users of a digital Code Division Multiple Access (CDMA) cellular telephone system, encode their transmissions with a common first code. Such first group of users are uniquely identifiable by providing a unique code phase offset for each user. The second group of users, who may be users of a high speed data service, encode their transmissions using the same code and one of the code phase offsets of that code. However, each of the users of the second group further encode their transmissions with an additional code, the additional code being unique for each of the users of the second group. This permits the transmissions of the second group of users to be orthogonal to each other while still maintaining the appearance of collectively being a single user of the first group.

The code assigned to the first group of users may be a common chipping rate, pseudorandom code. The code assigned to the second group of terminals may typically be a set of unique orthogonal codes. The individual members of the first group of terminals may be distinguished by scrambling codes that have unique phase offsets of a selected longer pseudorandom noise sequence.

In a preferred embodiment, certain steps are taken to ensure proper operation of the signaling among the second group of users or so-called "heartbeat." Specifically, a common code channel may be dedicated for use as a synchronization channel. This permits the maintenance of proper timing of the transmissions of the second group of terminals if, for example, the coding scheme is implemented in a reverse link direction.

In another embodiment, the users of the second group may be allocated specific time slots in which to transmit and therefore maintain the orthogonality through the use of time division multiple access. Again, the point is that the users of the second group collectively appear as a single user to the transmissions of the users in the first group.

The principles of the present invention allow current CDMA systems, designed for vehicular mobility, to support soft handoff for orthogonal channel users on their reverse link to increase the robustness of reverse link channel connections in a highly variable RF environment.

Since an orthogonal link must be time aligned to maintain orthogonality from one user to the next, a timing control loop is employed from a single base station. Orthogonality is not easily achieved to two base stations in a reverse link direction because the relative propagation time delays complicate time alignment at both base stations. Therefore, to use an orthogonal reverse link with soft handoff, there is a primary reverse link base station providing timing control and secondary base station(s) that may receive the transmissions non-orthogonally.

Specific criteria are defined to determine when it is advantageous to reassign the timing control from the primary base station to the secondary base station allowing for change of the orthogonal link from the first to the second base station. While there is only one orthogonal base station, signal levels received at the second base station may be sufficient for reception. These signals may be used to provide for diversity. This is particularly useful in high mobility systems.

Although only a single base station performs timing control, in a preferred embodiment, both perform power control. This is because, as the path loss to the non-orthogonal base station decreases as the user moves, the received power may become so strong it begins to generate excessive interference, reducing the capacity of the secondary base station. Therefore, when the signal level is adequate for reception at the secondary base station, commands or messages are transmitted to the subscriber unit to reduce the transmitted power. While these commands affect the received power at both the orthogonal base station and the non-orthogonal base station, it may be appropriate to reassign the timing control from the primary base station to the secondary base station. A typical condition may be when the measured path loss to the non-orthogonal or secondary base station exceeds some threshold difference of, for instance, 10 db.

Existing CDMA systems define reverse-link channelizations non-orthogonally. This is performed by defining unique spreading code shifts for each reverse-link user. Orthogonal and non-orthogonal backward compatibility can be achieved by orthogonal users for a primary base station sharing the same spreading code. When these user signals are received at other base stations, it is unlikely that they will be time aligned, but they will all have unique code shifts and be able to be uniquely identified based on the combination of code shift and orthogonal code. These signals are no more interfering than the standard non-orthogonal signals that are legacy to existing CDMA systems. Therefore, just as soft handoff is performed today, it can be performed with an orthogonal primary base station and non-orthogonal secondary base stations.

When the primary base station is re-assigned such that the timing now comes from a secondary base station (i.e., reverse link timing control handoff has taken place), there may be a significant delay and code phase offset. Using a conventional one-bit differential timing control loop may be too slow to quickly obtain orthogonality with the new base station when it is handed off. Therefore, when the handoff occurs, a gross timing adjustment command or message may be used to rapidly re-align the reverse link, where the gross timing adjustment may be absolute or relative. In the case of the timing command, the subscriber unit is told to make a coarse timing adjustment; in the case of the timing message, the subscriber unit autonomously responds to information in the timing message.

The criteria for timing control hand-off may be based on criteria, including at least one of the following:

1. The metric of an alternative path exceeds a threshold for a designated period of time;
2. The metric of an alternative path exceeds a threshold relative to the current path for a designated period of time;
3. The currently selected path drops below an absolute metric; or
4. The candidate path exceeds an absolute metric,
   where the metric may be one or more of the following
   a. Power;
   b. SNR;
   c. Variance of the power;
   d. Variance of the SNR; or
   e. Relative ratio of the above metrics between the two paths (i.e., the orthogonal link and the non-orthogonal link).

Power control (or SNR control) of an orthogonal reverse link (RL) may be based on both orthogonal (aligned) and non-orthogonal paths. When the SNR of a non-orthogonal path meets a quality criterion as listed above while a power control loop is active, timing control of the subscriber unit may be re-assigned to the base station associated with the non-orthogonal path.

Referring to the power control loop, if a command is sent, rather than a message or report, the command may be the minimum of the SNR of each path. For example, if two paths are being tracked, and one needs power and the other has too much power, the power is commanded to be lessened. This applies to a soft hand-off function as well, where the power output by the subscriber unit is increased only if all commands or messages providing power metrics require it to be increased.

There may be a relative offset between commands from a non-orthogonal path of a base station and those of the orthogonal path. For instance, the commands requiring more or less power from non-orthogonal paths may need to be more consistent or for a longer period of time or for a longer duration before the orthogonal path is ignored and the other paths control the reduction in power. The intra base station orthogonal zone may be handled in a like manner, as above.

Power control may be maintained by both orthogonal and non-orthogonal base stations while timing orthogonality is controlled by one base station. While power control is being maintained to both the orthogonal and non-orthogonal base stations, commands or messages including metrics must be sent to the subscriber unit transmitter down the forward link.

The power control commands from each base station may be based upon whether a quality metric is achieved at each respective base station. This quality metric may be bit error rate, signal-to-noise ratio, received power, or Ec/Io. Provided the metric is satisfied, then a command to reduce transmission power is sent. Since the access terminal receives commands from both base stations, often it will receive conflicting commands. When this occurs, the access terminal obeys the command to power down if one exists. This is effectively an exclusive-OR function; for instance, a power-up occurs only if both base stations command power up. If either base station commands a power-down, then a power-down occurs at the access terminal. This holds true for multi-bit commands as well, where the minimum increase or the maximum decrease in power is obeyed.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT(S)

A description of preferred embodiments of the invention follows.

Figure 1:
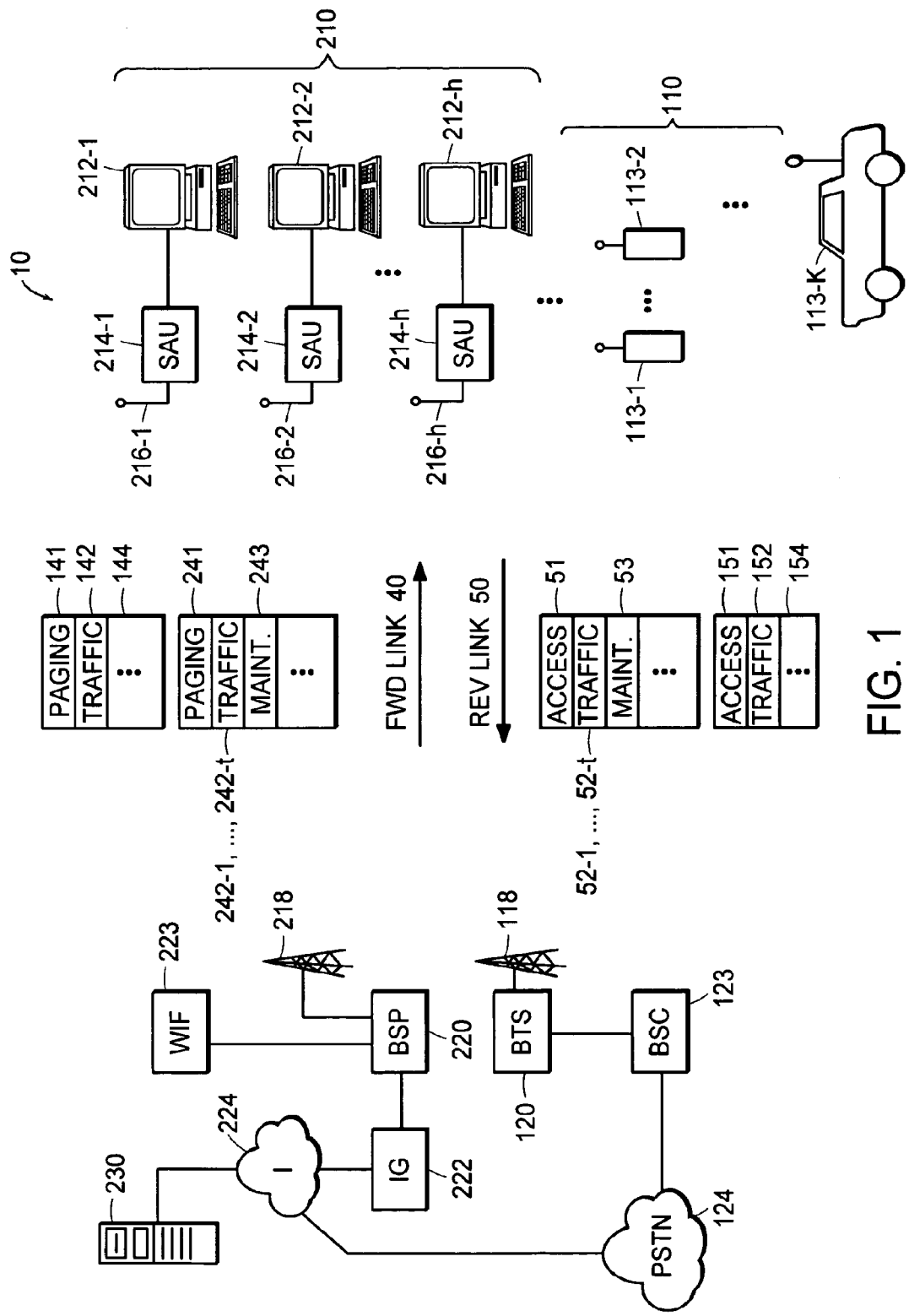
FIG. 1 is a block diagram of a wireless communications system supporting orthogonal and non-orthogonal links.

FIG. 1 is a block diagram of a Code Division Multiple Access (CDMA) communications system 10 that makes use of a signal encoding scheme in which a first class of logical channels are assigned unique long codes with different code phase offsets, and a second class of logical channels are provided by using a common code and common code phase offset, combined with an additional coding process using a unique orthogonal code for each channel.

In the following detailed description of a preferred embodiment, the communications system 10 is described such that the shared channel resource is a wireless or radio channel. However, it should be understood that the techniques described here can be applied to implement shared access to other types of media such as telephone connections, computer network connections, cable connections, and other physical media to which access is granted on a demand driven basis.

The system 10 supports wireless communication for a first group of users 110 as well as a second group of users 210. The first group of users 110 are typically legacy users of cellular telephone equipment such as wireless handsets 113-1, 113-2, and/or cellular mobile telephones 113-h installed in vehicles. This first group of users 110 principally use the network in a voice mode whereby their communications are encoded as continuous transmissions. In a preferred embodiment, these users' transmissions are forwarded from the subscriber units 113 through forward link 40 radio channels and reverse link 50 radio channels. Their signals are managed at a central location that includes a base station antenna 118, base transceiver station (BTS) 120, base station controller (BSC) 123. The first group of users 110 are therefore typically engaged in voice conversations using the mobile subscriber units 113, BTS 120, and BSC 123 to connect telephone connections through the Public Switch Telephone Network (PSTN) 124.

The forward link 40 in use by the first group of users may be encoded according to well known digital cellular standards such as this Code Division Multiple Access (CDMA) standard defined in IS-95B specified by the Telecommunications Industry Association (TIA). This forward link 40 includes at least a paging channel 141 and traffic channel 142, as well as other logical channels 144. These forward link 40 legacy channels 141, 142, 144 are defined in such a system by using orthogonally coded channels. These first group of users 110 also encode their transmissions over the reverse link 50 in accordance with the IS-95B standard. They therefore make use of several logical channels in a reverse link 50 direction, including an access channel 151, traffic channel 152, and other logical channels 154. In this reverse link 50, the first group of users 110 typically encode the signals with a common long code using different code phase offsets. The manner of encoding signals for the legacy users 110 on the reverse link 50 is also well known in the art.

The communications system 10 also includes a second group of users 210. This second group of users 210 are typically users who require high speed wireless data services. Their system components include a number of remotely located Personal Computer (PC) devices 212-1, 212-2, . . . 212-h, . . . 212-l, corresponding remote Subscriber Access Units (SAUs) 214-1, 214-2, . . . 214-h, . . . 214-l, and associated antennas 216-1, 216-2, . . . 216-h, . . . 216-l. Centrally located equipment includes a base station antenna 218, and a Base Station Processor (BSP) 220. The BSP 220 provides connections to an from an Internet gateway 222, which in turn provides access to a data network such as the Internet 224, and network file server 230 connected to the network 222.

The PCs 212 may transmit data to and receive data from network server 230 through bi-directional wireless connections implemented over the forward link 40 and reverse link 50 used by the legacy users 110. It should be understood that in a point to multi-point multiple access wireless communication system 10 as shown, a given base station processor 220 supports communication with a number of different active subscriber access units 214 in a manner which is similar to a cellular telephone communication network.

In the present scenario, the radio frequencies allocated for use by the first group 110 are the same as those allocated for use by the second group 210. The present invention is specifically concerned with how to permit a different encoding structure to be used by the second group 210 while creating minimal interference to the first group 110.

The PCs 212 are typically laptop computers 212-l, hand-held units 212-h, Internet-enabled cellular telephones or Personal Digital Assistant (PDA) type computing devices. The PCs 212 are each connected to a respective SAU 214 through a suitable wired connection such as an Ethernet-type connection.

An SAU 214 permits its associated PC 212 to be connected to the network file server 230 through the BSP 220, gateway 222 and network 224. In the reverse link direction, that is, for data traffic traveling from the PC 212 towards the server 230, the PC 212 provides an Internet Protocol (IP) level packet to the SAU 214. The SAU 214 then encapsulates the wired framing (i.e., Ethernet framing) with appropriate wireless connection framing and encoding. The appropriately formatted wireless data packet then travels over one of the radio channels that comprise the reverse link 50 through the antennas 216 and 218. At the central base station location, the BSP 220 then extracts the radio link framing, reformatting the packet in IP form and forwards it through the Internet gateway 222. The packet is then routed through any number and/or any type of TCP/IP networks, such as the Internet 224, to its ultimate destination, such as the network file server 230.

Data may also be transmitted from the network file server 230 to the PCs 212 in a forward link 40 direction. In this instance, an Internet Protocol (IP) packet originating at the file server 230 travels through the Internet 224 through the Internet gateway 222 arriving at the BSP 220. Appropriate wireless protocol framing and encoding is then added to the IP packet. The packet then travels through the antenna 218 and 216 to the intended receiver SAU 214. The receiving SAU 214 decodes the wireless packet formatting, and forwards the packet to the intended PC 212 which performs the IP layer processing.

A given PC 212 and the file server 230 can therefore be viewed as the end points of a duplex connection at the IP level. Once a connection is established, a user at the PC 212 may therefore transmit data to and receive data from the file server 230.

From the perspective of the second group of users 210, the reverse link 50 actually consists of a number of different types of logical and/or physical radio channels including an access channel 251, multiple traffic channels 252-1, ... 252-t, and a maintenance channel 53. The reverse link access channel 251 is used by the SAUs 240 to send messages to the BSP 220 to request that traffic channels be granted to them. The assigned traffic channels 252 then carry payload data from the SAU 214 to the BSP 220. It should be understood that a given IP layer connection may actually have more than one traffic channel 252 assigned to it. In addition, a maintenance channel 253 may carry information such as synchronization and power control messages to further support transmission of information over the reverse link 50.

Similarly, the second group of users have a forward link 40 that includes a paging channel 241, multiple traffic channels 242-1 ... 242-t, and maintenance channel 243. The paging channel 241 is used by the BSP 220 to not only inform the SAU 214 that forward link traffic channels 252 have been allocated to it, but also to inform the SAU 214 of allocated traffic channels 252 in the reverse link direction. Traffic channels 242-1 ... 242-t on the forward link 40 are then used to carry payload data information from the BSP 220 to the SAUs 214. Additionally, maintenance channels 243 carry synchronization and power control information on the forward link 40 from the base station processor 220 to the SAUs 214. It should be understood that there are typically many more traffic channels 241 than paging channels 241 or maintenance channels 243. In the preferred embodiment, the logical forward link channels 241, 242, and 243 and 251, 252, and 253 are defined by assigning each channel a pseudorandom noise (PN) channel code. The system 10 is therefore a so-called Code Division Multiple Access (CDMA) system in which multiple coded channels may use the same radio frequency (RF) channel. The logical or codes channels may also be further divided or assigned among multiple active SAUs 214.

The sequence of signal processing operations is typically performed to encode the respective reverse link 50 logical channels 51, 52, and 53. In the reverse link direction, the transmitter is one of the SAUs 214 and the receiver is the Base Station Processor (BSP) 220. The preferred embodiment of the invention is implemented in an environment where legacy users of a CDMA digital cellular telephone system such as one operating in accordance with the IS-95B standard are also present on the reverse link 50. In an IS-95B system, reverse link CDMA channel signals are identified by assigning non-orthogonal pseudorandom noise (PN) codes.

Figure 2:
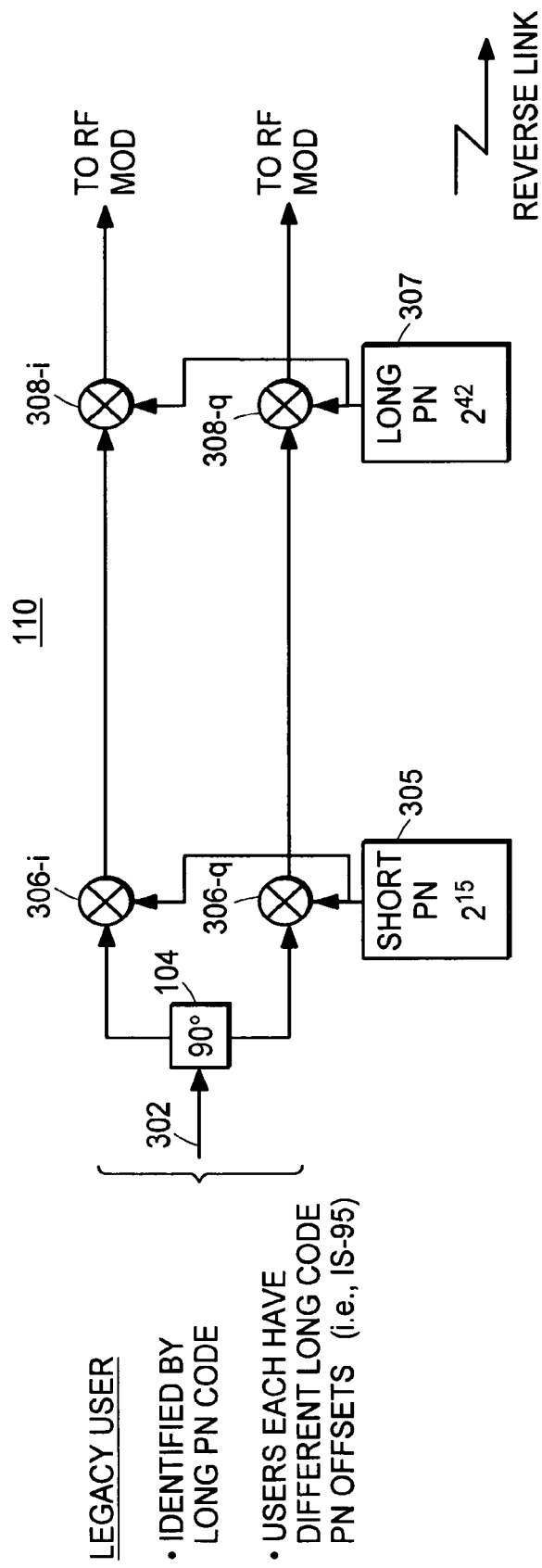
FIG. 2 is a block diagram of a circuit employed by the access terminal of FIG. 1.

Turning attention now to FIG. 2, the channel encoding process for the first group of legacy users 110 will be described in greater detail. This first class of users includes, for example, digital CDMA cellular telephone system users that encode signals according to the IS-95B standard as mentioned above. The individual channels are therefore identified by modulating the input digitized voice signal by a pseudorandom noise (PN) code sequence for each channel. Specifically, the channel encoding process takes an input digital signal 302 that represents the information to be transmitted. A quadrature modulator 304 provides an in-phase (i) and quadrature (q) signal path to a pair of multipliers 306-i and 306-q. A short pseudorandom noise (PN) code generator 305 provides a short (in this case a 2 15-1 or 32767 bit) length code used for spectrum spreading purposes. The short code typically therefore is the same code for each of the logical channels for the first group 110.

A second code modulation step is applied to the (i) and (q) signal paths by multiplying the two signal paths with an additional long PN code. This is accomplished by the long code generator 307 and the long code multipliers 308-i and 308-q. The long code serves to uniquely identify each user on the reverse link 50. The long code may be a very long code, which, for example, only repeats every 2 42-1 bits. The long code is applied at the short code chipping rate, e.g., one bit of the long code is applied to each bit output by the short code modulation process, so that further spectrum spreading does not occur.

Individual users are identified by applying different phase offsets of the PN long code to each user.

It should be understood that other synchronization steps need not be taken for the first group of users 110. Specifically, these transmissions on the reverse link 50 are designed to be asynchronous and therefore are not necessarily perfectly orthogonal.

Figure 3:
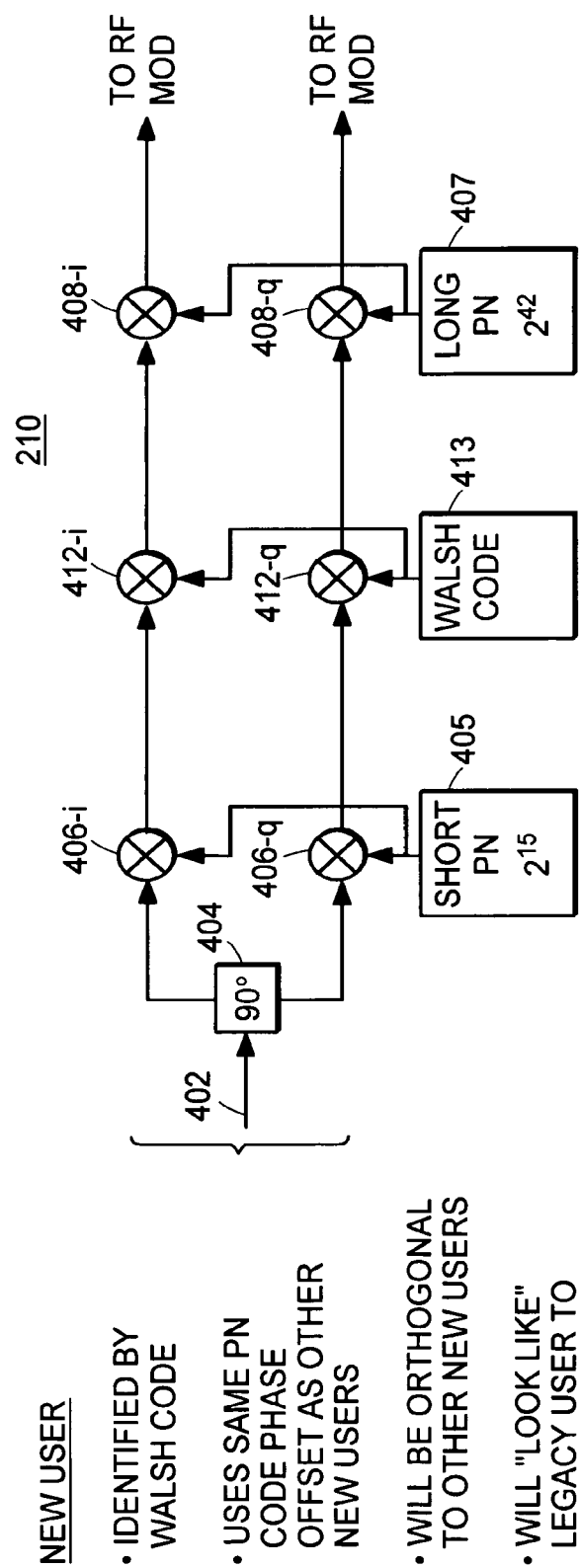
FIG. 3 is a block diagram of the circuit of FIG. 2 further including a code generator to operate on an orthogonal link with other access terminals.

FIG. 3 is a more detailed view of the channel encoding process for the second group of users 210. This second group 210, for example, includes wireless data users that encode signals according to a format optimized for data transmission.

The individual channels are identified by modulating the input data by a pseudorandom noise (PN) code sequence that is the same code sequence used for the first group of users 110. However, as will be understood shortly, the channels in the second group 210 are uniquely identified by specific orthogonal codes such as Walsh codes. Specifically, the channel encoding process for this second group of users 210 takes an input digital signal 402 and applies a number of codes as generated by a short code generator 405, Walsh code generator 413, and long code generator 407.

As a first step, a quadrature modulator 404 provides an in-phase (i) and quadrature (q) signal path to a first pair of multipliers 406-$i$ and 406-$q$. The short pseudorandom noise (PN) code generator 405 provides a short, in this case, a 215 length code used for spectrum spreading purposes. This short code therefore is the same as the short PN code used for each of the channels in the first group 110.

A second step in the process is to apply an orthogonal code such as generated by the Walsh code generator 413. This is accomplished by the multipliers 412-$i$ and 412-$q$ impressing the orthogonal code on each of the in-phase and quadrature signal paths. The orthogonal code assigned to each logical channel is different, and uniquely identifies such channels.

In a final step of the process, a second pseudorandom noise (PN) long code is applied to the (i) and (q) signal paths. The long code generator 407 thus forwards the long code to a respective one of the in-phase 408-$i$ and quadrature 408-$q$ multipliers. This long code does not uniquely identify each user in the second group 210. Specifically, this code may be one of the very same long codes that are used in the first group that uniquely identify their first group of users 110. Thus, for example, it is applied in the same manner as a short code chipping rate code so that one bit of the long code is applied to each bit output by the short code modulation process. In this manner, all of the users in the second group 210 appears as a single legacy user of the first group 110. However, the users of the second group 210 may be uniquely identified given that they have been assigned unique orthogonal Walsh codes.

As the implementation in the preferred embodiment is on a reverse link 50, additional information must be provided in order to maintain orthogonality among the various users in the second group 210. Specifically, a maintenance channel 243 is therefore included in the forward link 40. This maintenance or "heartbeat" channel provides synchronization information and/or other timing signals so that the remote units 214 may synchronize their transmissions appropriately. The maintenance channel may be time slotted. For more details of the formatting of this forward link maintenance channel 243, reference can be made to a co-pending U.S. patent application Ser. No. 09/775,305 filed Feb. 1, 2001 entitled "MAINTENANCE LINK USING ACTIVE/ STANDBY REQUEST CHANNELS," which is hereby incorporated by reference in its entirety.

It should be understood that certain infrastructure may therefore be shared by both the second group of users 210 and first group of users 110. For example, the antennas 218 and 118 although shown as separate base station antennas in FIG. 1 may indeed be a shared antenna. Likewise, the location for the antennas may therefore be the same. This permits the second group of users 210 to share equipment and physical build-out locations already in place and in use by the legacy users 110. This greatly simplifies the deployment of wireless infrastructure for this new group of users 210, for example, new locations and new antenna sites need not be built out.

Figure 4:
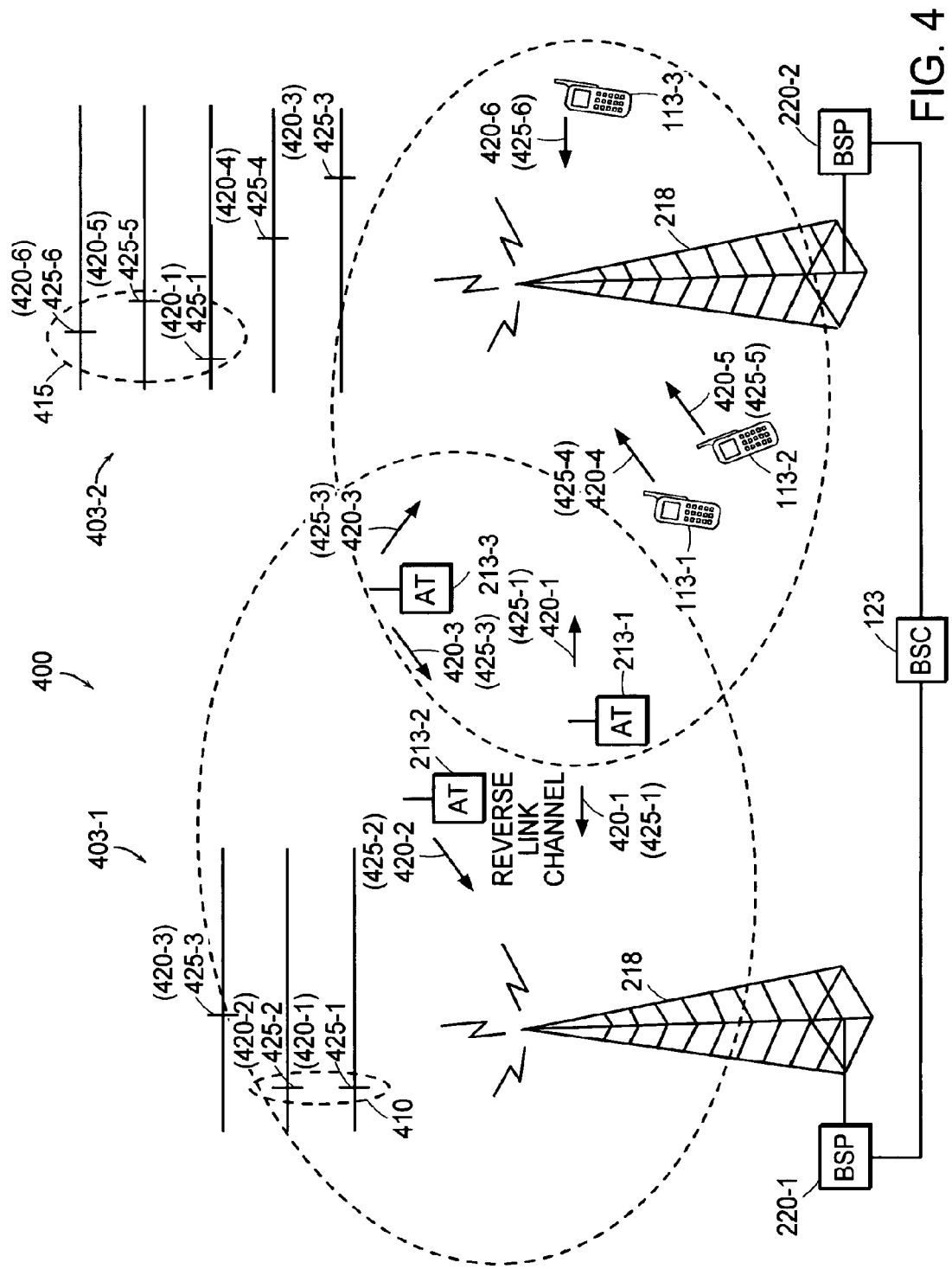
FIG. 4 is a block diagram of the wireless communications system of FIG. 1 having multiple field units using orthogonal and non-orthogonal links.

FIG. 4 is a network diagram similar to FIG. 1. In this wireless network 400, a first Base Station Processor (BSP) 220-1 and second base station processor 220-2 (collectively 220) provide access to other networks (e.g., the Internet or PSTN) for access terminals 213-1, 213-2, . . . , 213-3 and handheld units 113-1, 113-2, and 113-3. The base station processors 220 also support soft handoff of CDMA reverse links using orthogonal channels for non-legacy access terminals 213 while at the same time allowing legacy handheld units 113 to use reverse links in a typical manner. Access terminals 213 and handheld units 113 are interchangeably referred to as field units or Subscriber Access Units (SAUs).

"Legacy" field units refers to field units that are not equipped with a modulation process that applies unique orthogonal codes for sharing a common reverse link channel with other field units. "Non-legacy" field units refers to field units that are equipped with a modulation process that applies unique orthogonal codes for sharing a common reverse link channel with other field units. The BSPs 220 support soft handoff by selectively re-assigning timing control of reverse link channels based on criteria. In a preferred embodiment, both BSPs 220 provide power control feedback to the field units.

Continuing to refer to FIG. 4, above the antenna towers 218 are first and second timing diagrams 403-1 and 403-2 (collectively 403) that illustrate the related timings of reverse link signals for each of the field units communicating with the respective base station processors 220. These timing diagrams 403 illustrate a distinction between orthogonal reverse link channels that are time aligned and orthogonal or non-orthogonal channels that are not time aligned. As discussed above, each non-legacy access terminals 213 that shares a common reverse link channel has an additional coding process to add a unique orthogonal code to distinguish its reverse link signals from reverse link signals of other network devices using the common reverse link channel.

For purposes of this discussion, it is assumed that (i) the access terminals 213 share a common reverse link orthogonal channel and (ii) the three handheld units 113 use legacy, non-orthogonal, communication techniques in the reverse link.

In the first timing diagram 403-1, the first base station processor 220-1 employs an alignment controller (not shown) to align the timing of reverse link orthogonal channels of access terminals for which the BSP 220-1 controls. In this case, the BSP 220-1 controls the timing of the reverse link logical channels 420-1 and 420-2, represented by vertical tick marks 425-1 and 425-2, of the first and second field units 213-1 and 213-2, respectively. Reverse link channels that have their reverse links time aligned (i.e., common long codes phase aligned) are referred to as "native" orthogonal channels 410. The third access terminal 213-3 that is also in communication with the first base station processor 220-1 does not have its reverse link logical channel 420-3 (425-3) time aligned with the reverse link logical channels of the first and second access terminals 213-1 and 213-2. The third access terminal 213-3 has its reverse link channel 420-3 controlled by the second BSP 220-2. Accordingly, the timing of the reverse link logical channel 420-3 (425-3) for the third field unit 213-3 is shown offset in the first timing diagram 403-1 from the native orthogonal channels 425-1 and 425-2.

In the second timing diagram 403-2, reverse link logical channels 420-1, 420-3, 420-4, 420-5, and 420-6 of the five wireless network devices 213-1, 213-3, 113-1, 113-2, and 113-3 in communication with the second base station processor 220-2 are represented by vertical tick marks 425-1, 425-3, 425-4, 425-5, and 425-6, respectively. The second BSP 220-2 controls the timing of the third access terminal 213-3 reverse orthogonal link 420-3 (425-3) but neither of the other access terminals 213-1, 213-2. Therefore, as expected, the reverse link logical channels 420 (425) are offset in phase from one another at the second BSP 220-2, as indicted in the second timing diagram 403-2. Three of the reverse link channels 425-1, 425-5, and 425-6 are relatively close together in time at the second BSP 220-2 and are referred to as "foreign" orthogonal channels 415.

The foreign orthogonal channels 415 are not truly orthogonal in that the channels do not have the unique orthogonal codes to distinguish one from another on a common, reverse link channel. Therefore, if the foreign orthogonal channels 415 were to be aligned, they would destructively interfere with each other at the second BSP 220-2. In a particular situation, each of the base station processors 220 may be supporting native orthogonal channels 410 and foreign or non-orthogonal channels 415. This situation indicates that a combination of non-legacy and legacy field units, respectively, can be used within the same cell zone.

In existing orthogonal technology, there is no soft handoff technique in the reverse link for when a field unit, such as one of the access terminals (e.g., 213-3), moves from a cell zone of a first base station processor 220-1 to a cell zone of a second base station processor 220-2. The reverse link soft handoff technique disclosed herein (i) supports communication in the reverse link from non-legacy wireless network devices 213 to multiple base station processors 220, (ii) performs timing and power control (described later), and (iii) coordinates which of the multiple base station processors 220 is the "master" of the reverse link timing control for a field unit based on criteria, described in reference to FIG. 8. By coordinating which of the multiple BSPs 220 controls timing of the reverse link channel of a given access terminal 213, the given access terminal 213 can move from one cell zone to another cell zone without loss of connection in the reverse link. The principles of the present invention also include a technique for rapid orthogonal timing alignment (i.e., adjusting the phase of the long code of the common logical channel for an access terminal 213 such that the common reverse link channel is time aligned, or mutually orthogonal, with the common reverse link channel of other access terminals 213).

The base station processor 220 receiving control of the timing of the reverse link channel determines a gross offset of the timing of the field unit's reverse link logical channel as a function of the timing of the reverse link logical channel of other field units sharing the same reverse link logical channel. The gross offset is transmitted to the field unit 213 in the form of an offset command or offset message. Based on the gross offset information, the field unit makes a coarse timing adjustment of the logical channel in accordance with the gross timing offset. Following the coarse timing adjustment, a fine timing adjustment may be made in accordance with fine timing offsets that may be measured by the base station processor 220 following the coarse timing adjustment of the reverse link logical channel 420.

Figure 5:
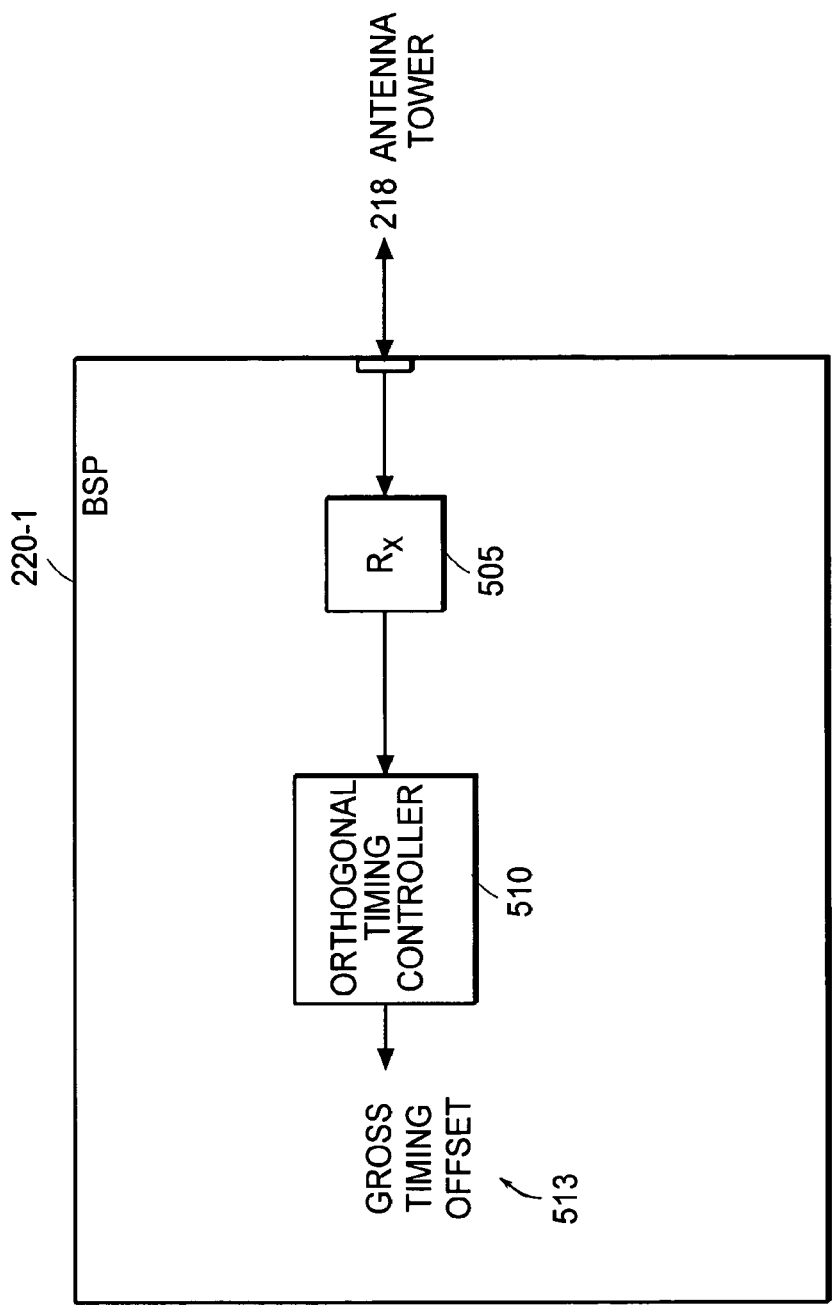
FIG. 5 is a block diagram of a base station processor (BSP) of FIG. 4 having an orthogonal timing controller to control the timing of access terminals on the orthogonal link.

FIG. 5 is a block diagram of one of the base station processors 220-1 that includes provisions for soft handoff of a CDMA reverse link utilizing an orthogonal channel structure. The base station processor 220-1 receives reverse link channels from the field units 113, 213 via the antenna tower 218. A receiver 505 receiving a reverse link channel from a given field unit 213 sends the received signal to an orthogonal timing controller 510. The orthogonal timing controller 510, or equivalent unit, determines a gross timing offset 513 with respect to reverse link channels from other field units sharing the same reverse link logical channel. The gross timing offset 513 may be an absolute measure for transmittal to the given field unit 213 in the form of a command or may be a relative measure and sent back to the given field unit 213 in the form of a message, with the given field unit 213 using additional processing to determine the timing offset (i.e., phase adjustment) of the reverse link signal. A combination of absolute and relative measures may also be employed.

Figure 6A:
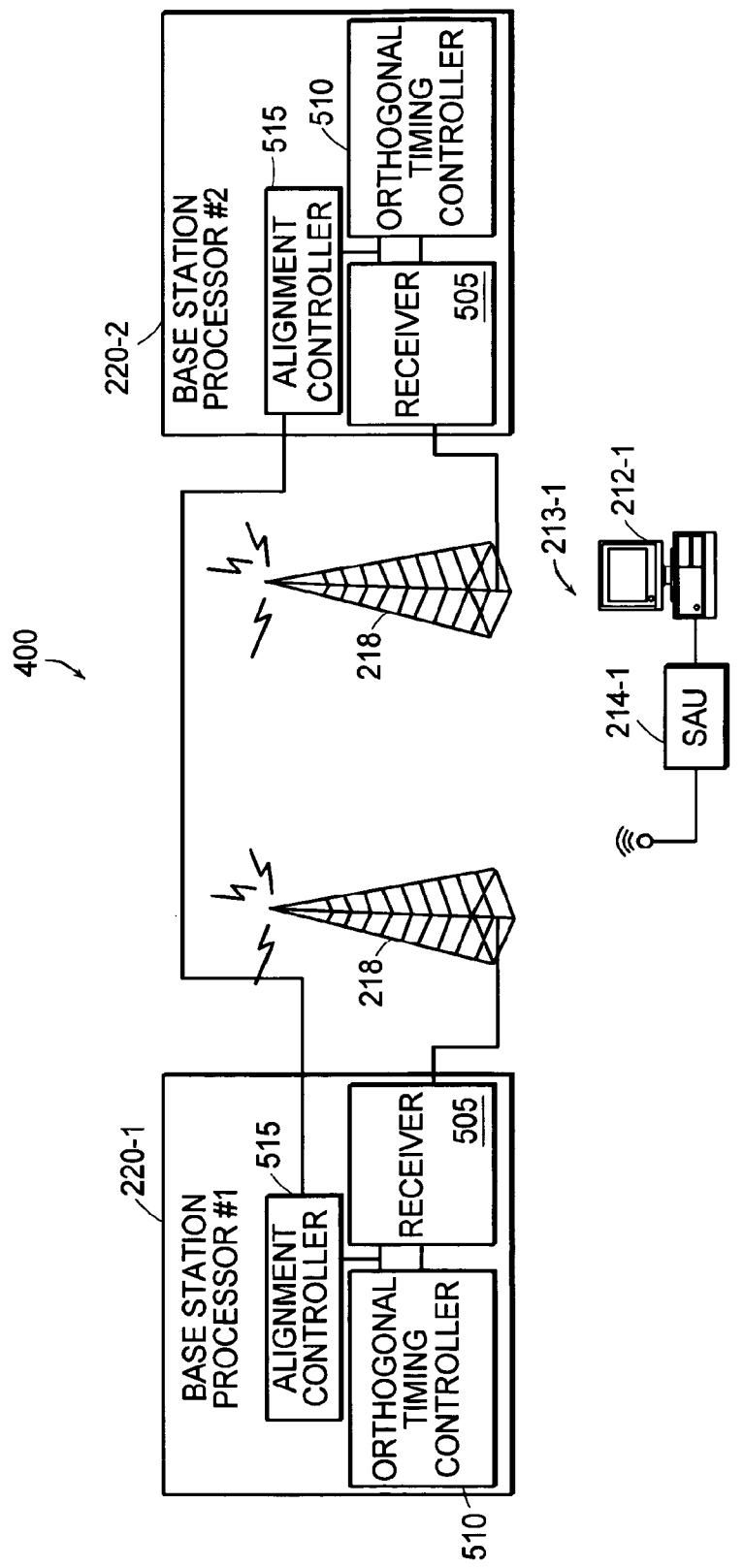
FIG. 6A is a network diagram of the network of FIG. 4 having an alignment controller located in the base station processors.

FIG. 6A is a schematic diagram of the network having the first base station processor 220-1 and second base station processor 220-2. The base station processors 220 include respective alignment controllers 515. The alignment controllers 515 are used by the base station processors 220 to select or control which base station processor 220 controls the timing alignment of the reverse links 420 of the field units 213.

To determine which BSP 220 should control the timing alignment for the field unit 213-1, the alignment controllers 515 may calculate a metric (e.g., Signal-to-Noise ratio (SNR)) associated with the signal received from the field unit 213-1.

A given alignment controller 515 may issue a message to other alignment controller(s) 515 to tell the other base station processors 220 that the associated base station processor 220 associated with the given alignment controller 515 is going to control the timing of the reverse link channel of the field unit 213-1. Alternatively, the given alignment controller 515 may issue a command or message to another alignment controller 515, such as the alignment controller 515 in the second base station processor 220-2, that the second base station processor 220-2 should control the timing of the reverse link channel of the field unit 213-1. Other negotiating arrangements may occur between or among the alignment controllers 515 to determine which base station processor 220 is going to control the alignment of the field unit 213. Once a base station processor 220 has been commanded or has elected to control the timing of the orthogonal reverse link channel, the orthogonal timing controllers 510 are employed to determine a gross timing offset, as discussed above for facilitating the timing control handoff.

Figure 6B:
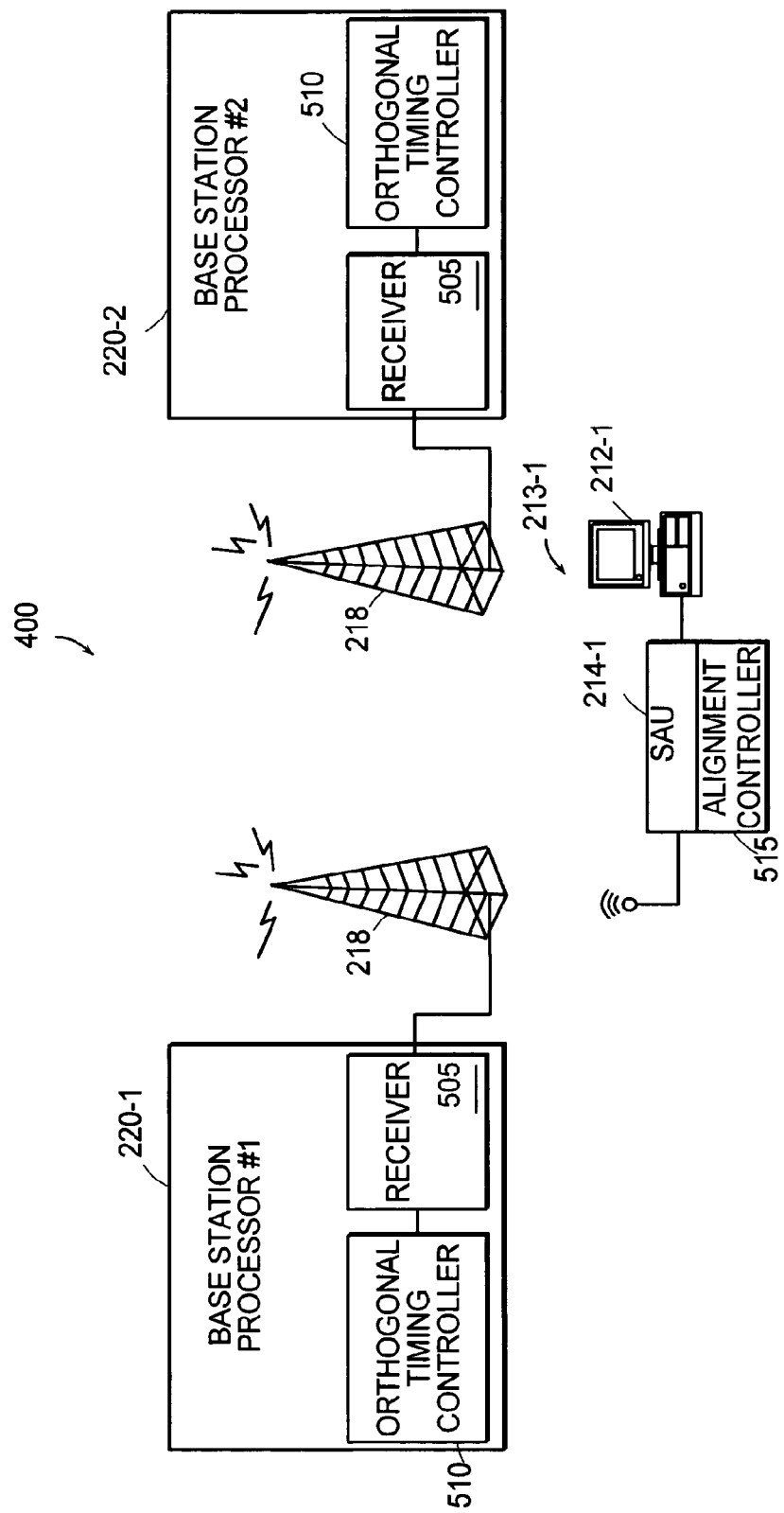
FIG. 6B is a network diagram of the network of FIG. 4 having an alignment controller located in the field unit.

FIG. 6B is a schematic diagram of the wireless network in which the alignment controller 515 is deployed as part of the field unit 213-1, in this case incorporated into the subscriber access unit 214-1. Alternatively, the alignment controller 515 may be included in the PC 212-1 or as a standalone unit electrically connected to either the Subscriber Access Unit (SAU) 214-1 or PC 212-1.

In this arrangement, the alignment controller 515 provides a command or message to the SAU 214-1 at the field unit 213-1 to cause the field unit 213-1 to respond to a timing control signal received from either the first base station processor 220-1 or second base station processor 220-2.

Figure 6C:
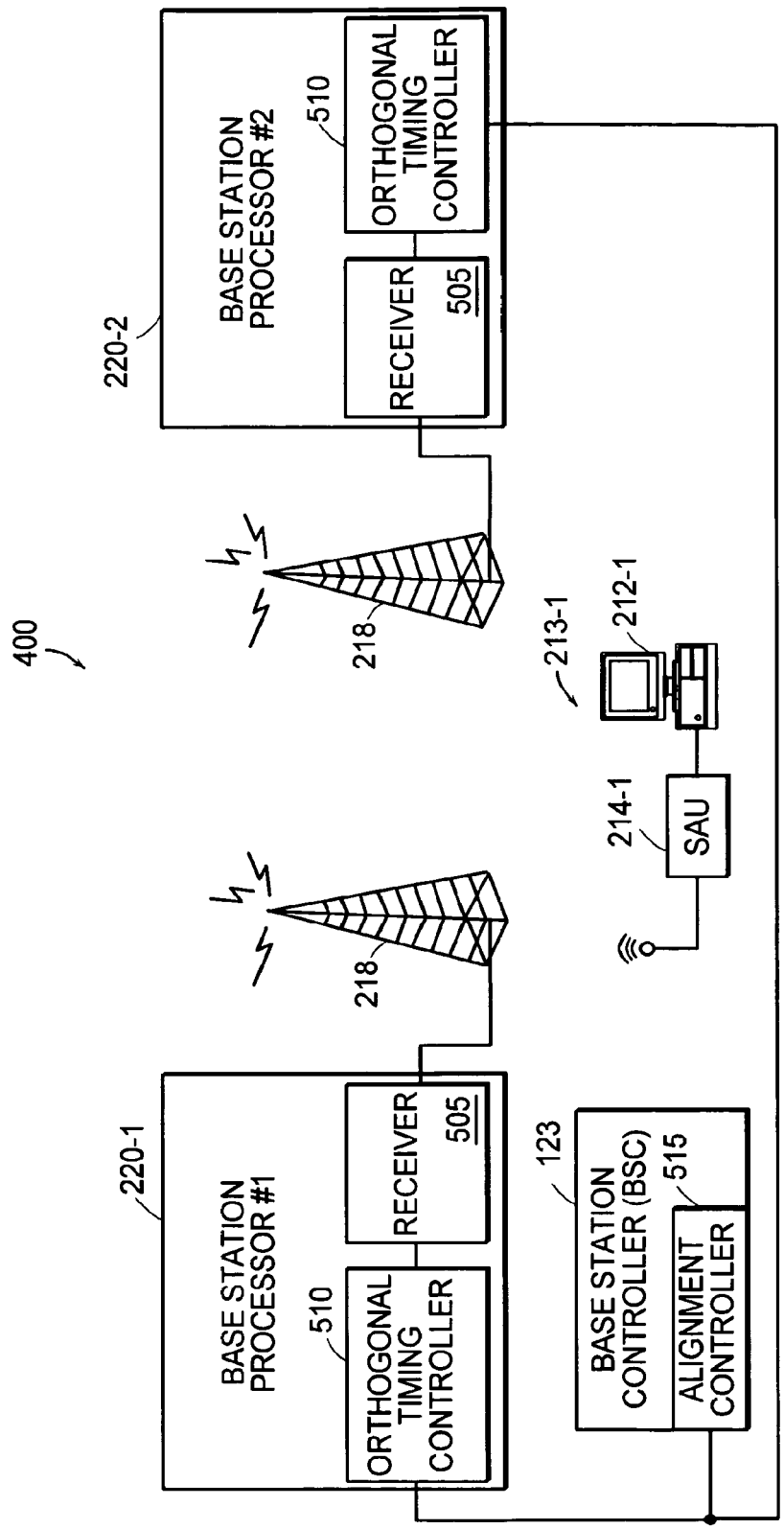
FIG. 6C is a network diagram of the network of FIG. 4 having an alignment controller located in a base station controller.

FIG. 6C is a schematic diagram of the wireless network 400 in which the alignment controller 515 is deployed in the base station controller (123). In this case, the alignment controller 515 may receive information from each of the orthogonal timing controllers 510 from the first base station 220-1 or the second base station 220-2 to determine which base station processor 220 should be controlling the timing of the orthogonal, reverse link channel for the field unit 213-1. The alignment controller 515 may make this determination based on a number of factors, such as the signal-to-noise ratio of the reverse link signal at each of the base station processors 220. The alignment controller 515 may use commands or messages to indicate which base station processor 220 is to control the timing of the reverse link of the field unit 213-1. In either case, the selected base station processor 220 may issue a command or message to the field unit 213-1 that it is the base station processor 220 that will be controlling the timing of the orthogonal reverse link channel. It should be understood that the alignment controller 515 may also understand the concept of diversity and make selections as to which base station processor 220 is to control the timing of the reverse link channel so as to maximize the effectiveness of diversity between the base station processors 220.

Figure 7:
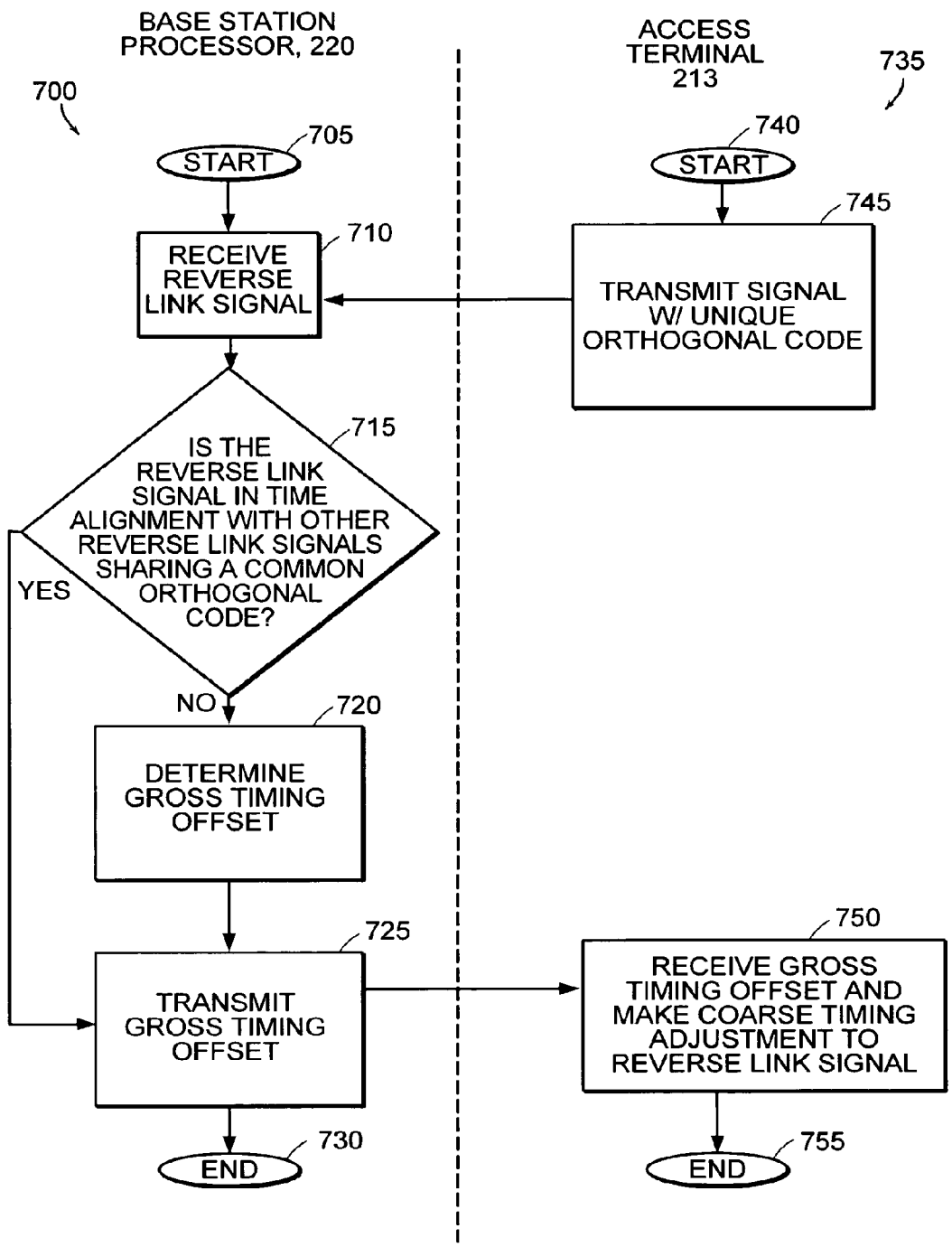
FIG. 7 is a flow diagram of processes that may be employed by the base terminal station and access terminals of FIG. 4 to make signals mutually orthogonal.

FIG. 7 is a flow diagram of a soft handoff process of a CDMA orthogonal reverse link in accordance with the principles of the present invention. In this example, the first base station processor 220-1 executes a first process 700, and the access terminal 213 executes a second process 735. Following the start of the BSP process 700 in step 705, the BSP process 700 waits to receive a reverse link signal in step 710 from the access terminal 213. Following the start of the access terminal process 735 in step 740, the access terminal 213, in step 745, transmits a reverse link signal with the unique orthogonal code on a reverse link channel common to reverse link signals of other access terminals 213. The BSP process 700 receives the reverse link signal in step 710 and continues in step 715. In step 715, the BSP process 700 determines whether the long code, identifying the access terminal 213 belonging to an orthogonal reverse link group, in the reverse link signal is in phase with long codes of other access terminals 213 in the same access terminal group, as described in reference to FIGS. 2 and 3. It is the long codes, and not the unique, specific, orthogonal codes, such as Walsh codes, that are time aligned by the base station processor 700. The unique, identifying codes of the reverse link signals are mutually orthogonal when the long codes are phase.

If the long code in the reverse link signal is in phase (i.e., time aligned) with the long codes of other reverse link signals of other access terminals 213 in the same mutually orthogonal reverse link group, the process 700 ends at step 730. If the long code is not in phase with long codes in reverse link signals of other access terminals, the BSP process 700 continues in step 720, where a determination of the gross timing offset is made by the orthogonal timing controller 510, as discussed above in reference to FIG. 5.

The BSP process 700 continues in step 725, where the base station processor 220 transmits the gross timing offset to the access terminal 213 in the form of a command or message. The access terminal process 735 receives the gross timing offset and adjusts the timing of the reverse link signal in step 750. The access terminal process 735 ends in step 755, and the BSP process 700 ends in step 730.

Figure 8B:
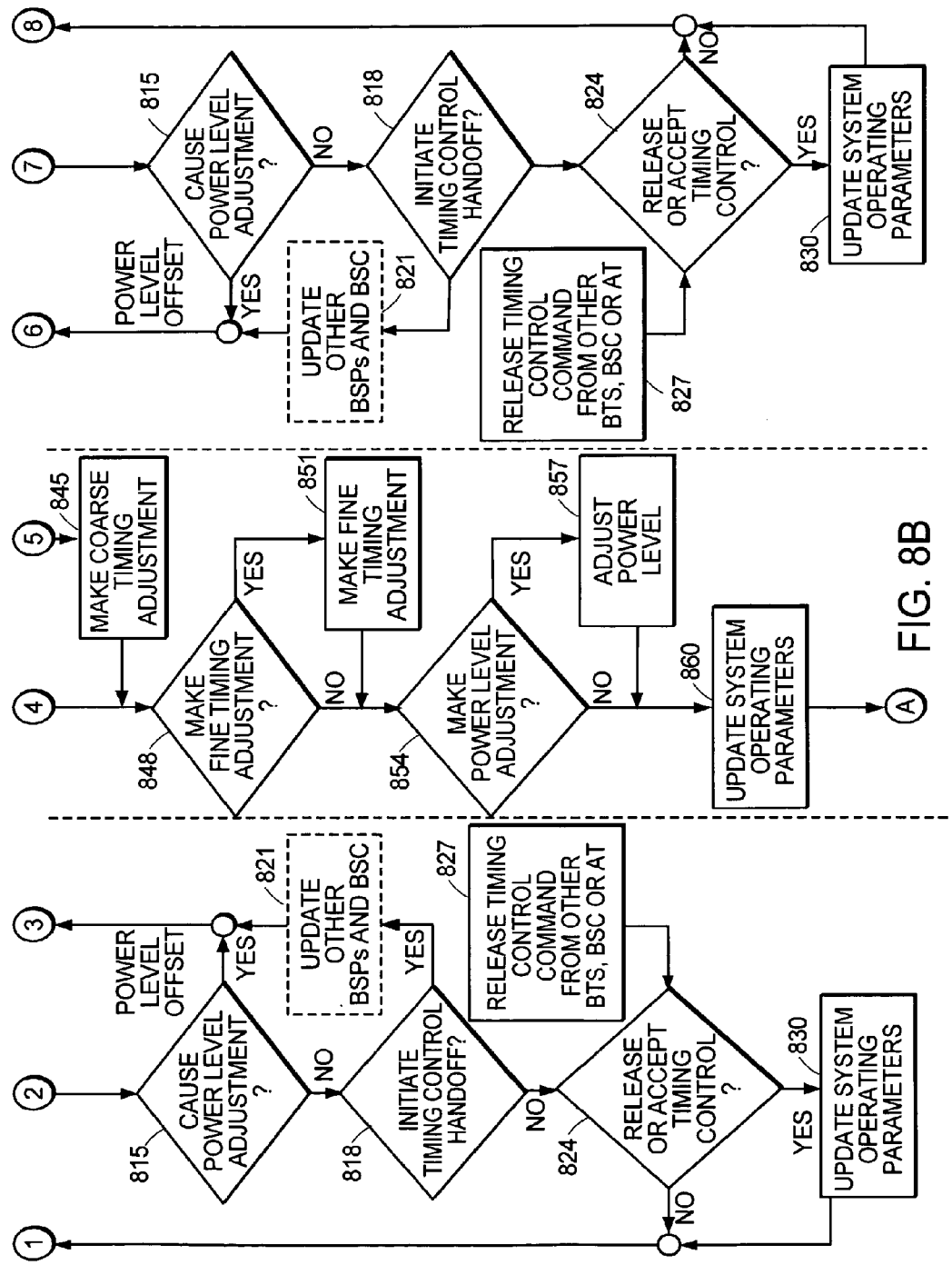
FIG. 8 is a flow diagram of processes that may be employed by the base terminal stations and access terminal in the multi-cell environment of FIG. 4 for soft-handoff.

FIG. 8 is a flow diagram of the two base station processors 220-1 and 220-2 as they interact with the access terminal 213. The first base base station processor 220-1 executes a process 800 that controls the timing of the reverse link of the access terminal 213. The other base station processor 220-2 executes a process 802 that provides processing that is not controlling the timing of the reverse link of the access terminal 213. The access terminal 213 executes its own process 833. The process 833 is capable of receiving feedback, making adjustments to the timing of the reverse link signal in coarse and fine amounts, and making power level adjustments in accordance with power level feedback received from the base station processors 220.

The access terminal 213 transmits signals (step 836) that are received by the first base station processor 220-1 and the second base station processor 220-2. In this example, it is assumed that the first base station processor 220-1 has previously been selected to control the timing of the reverse link signal by the access terminal 213. The first base station processor 220-1 thus receives the reverse link orthogonal signals (step 803) from the access terminal 213 that is either aligned with other reverse link signals sharing the same reverse link channel or is to be aligned with other reverse link signals from other access terminals 213 using the same reverse link channel. The base station processor 220-1 determines whether the signal from the access terminal 213 meets a timing criterion or criteria in step 806. If the signal does not meet a timing criterion or criteria, the process 800 determines a gross timing offset to feed back to the access terminal 213 to bring the signal in alignment with the other signals using the same code. Feedback is received by the access terminal 213 in step 839. If the signal meets the timing criterion or criteria, the process 800 continues in step 809, where the process 800 determines whether a fine timing offset is necessary. If yes, the process 800 sends to the access terminal 213, which is the fine timing offset, which is received in step 839 of the process 833 executed by the access terminal 213. If no fine timing offset is necessary, the process 800 continues in step 815.

In step 815, the base station processor 220-1 determines whether the power level of the signal transmitted by the access terminal 213 should be adjusted. Similarly, the second base station processor 220-2 also determines whether it should cause a power level adjustment in step 815 of the access terminal 213. In either case, the power level offsets are sent to the access terminal 213 in the forward link.

If no power level adjustment is needed, in reference to both the first base station processor process 800 and second base station processor process 802, the respective processes continue to step 818, where a determination is made as to whether timing control handoff should be initiated. Timing control handoff may be initiated based on a set of criteria:
 (a) the metric of an alternative path exceeds a threshold for a predesignated period of time;
 (b) the metric of an alternative path exceeds a threshold relative to the current path for a designated period of time;
 (c) the currently selected path drops below an absolute metric; and
 (d) the candidate path exceeds an absolute metric, where the metric may be one or more of the following:
  (a) power;
  (b) SNR;
  (c) variance of the power;
  (d) variance of the SNR; and
  (e) relative ratio of the two paths.

If there has been an initiation of timing control handoff, then, in step 821, the base station processor 220-1 updates other base station processors and the base station controller 123. The access terminal 213 may also be told of the timing control handoff. If the timing control has not been handed off, the processes 800 and 802 continue in step 824, where a determination is made to release or accept the timing control should another base station processor 220, base station controller 123, or access terminal 213 send a command or message to the base station processor 220 that it will be controlling the timing of the reverse link signal. If the base station processor releases or accepts timing control duties, the processes 800, 802 continue in step 830 to update system operating parameters; otherwise, the processes 800, 802 continue back to step 803 to receive signals from the access terminals 213.

The process 833 executed by the access terminal 213 receives feedback in step 839 and processes the feedback as follows. First, if no feedback is received, the process 833, in this embodiment, loops waiting for feedback in step 839. If feedback is received, the process continues in step 842 to determine whether a coarse timing adjustment command or message has been received. If yes, the coarse timing adjustment is made in step 845. It should be understood that the course timing adjustment may be an absolute or relative measure, as disclosed above.

In step 848, the access terminal 213 determines whether a fine timing adjustment command or message has been received. If yes, the fine timing adjustment is made in step 851. It should be understood that the fine timing adjustment is typically a differential command or message. Following the fine timing adjustment, the process 833 determines whether a power level adjustment command or message has been received. If yes, the access terminal 213 adjusts the power level in step 857.

Following the adjustments to the timing or power, the process 833 updates the operating parameters of the access terminal 213 in step 860. Following update of the system parameters, the process 833 repeats at step 839, awaiting feedback from one or more base station processors 220.

Figure 9A:
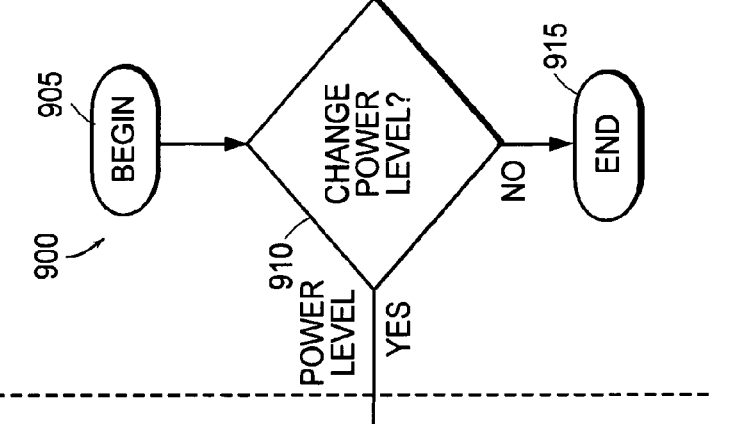
FIG. 9 is a flow diagram of processes that may be employed by the base terminal stations and access terminals of FIG. 1 for power control.
Figure 9A:
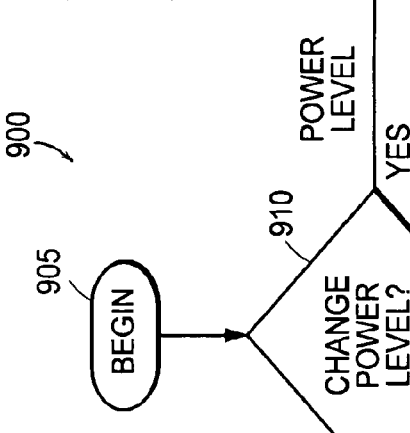
Figure 9B:
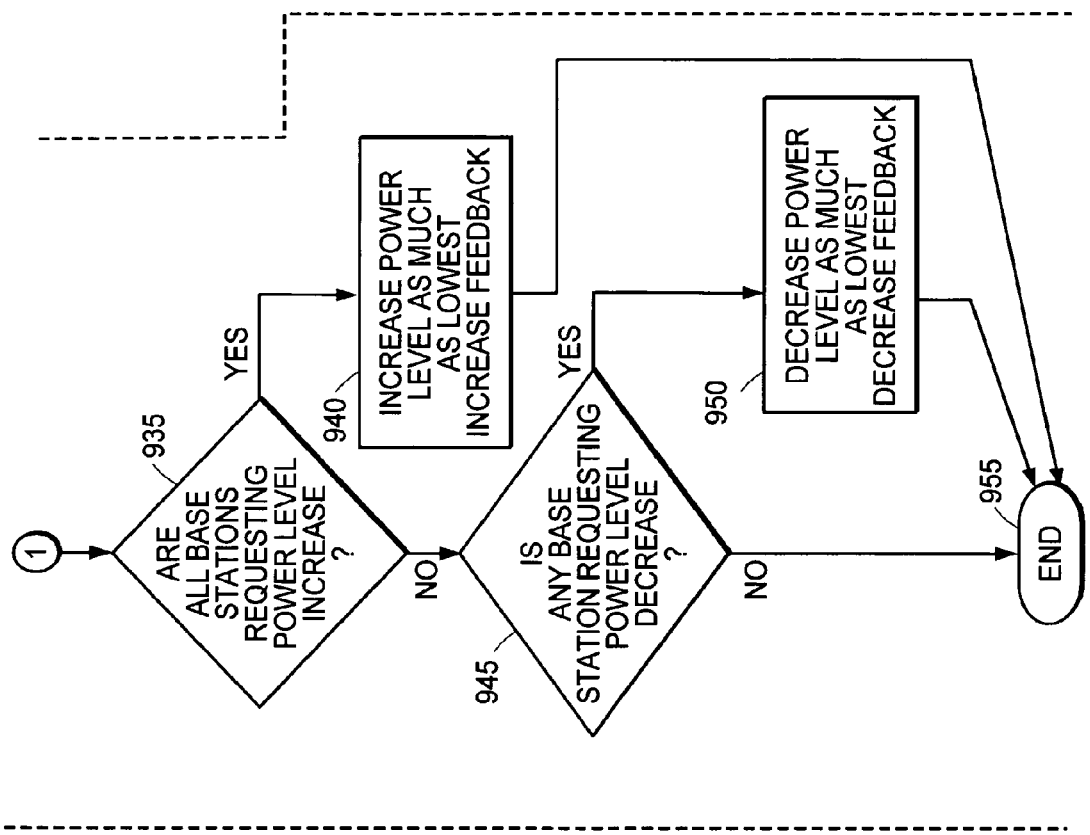

FIG. 9 is a flow diagram of processes 900, 920 executed by the base station processors 220 and the access terminal 213, respectively, for adjusting the power level of the reverse link signal transmitted by the access terminal 213. Referring to the processes 900, executed by the base station processors 220, the processes 900 begin in step 905. In step 910, the base station processors 220 determine whether to cause the access terminal 213 to change the power level of the reverse link signal in step 910. If the change of the reverse link signal power level is desired, feedback is sent to the access terminal 213 in the form of a command or message. The base station processor 220 process 900 ends in step 915.

The process 920 executed by the access terminal 213 begins in step 925. Once feedback is received in step 930, the process 920 continues in step 935, where a determination is made as to whether all base station processors 220 are requesting a power level increase. If yes, the process 920 continues in step 940, where the access terminal 213 increases the power level of the reverse link signal as much as the lowest increase feedback. If not all of the base station processors 220 are requesting power level increase, a determination is made in step 945 as to whether any base station processor 220 is requesting a power level decrease. If yes, the access terminal 213, in step 950, decreases a power level as much as a lowest decrease feedback. The process 920 ends in step 955 or may simply loop back to step 930 to wait to receive a power level feedback.

While power control is being maintained to both the orthogonal and non-orthogonal base stations, commands or metrics may be sent to the subscriber base transmitter (i.e., access terminal 213) via a forward link. The power control commands from each base station processor 220 may be based upon whether a signal quality metric is achieved at each respective base station processor 220. This signal quality metric may be a bit-error-rate (BER), signal-to-noise ratio (SNR), received power, or Ec/Io, for example. Provided the metric is satisfied, a command to reduce transmission power may be sent. Since the access terminal 213 receives commands or messages from both base station processors 220, often it reflects conflicting commands. When this occurs, the access terminal 213 obeys the command to "power down." This is effectively an exclusive-OR function; for instance, a "power up" occurs if both base station processor 220 command power up. If either base station processor 220 commands a power down, a power down occurs. This holds true for multi-bit commands as well, where the minimum increase or the maximum decrease in power is obeyed.

While this invention has been particularly shown and described with references to preferred embodiments thereof, it will be understood by those skilled in the art that various changes in form and details may be made therein without departing from the scope of the invention encompassed by the appended claims.

What is claimed is:

1. A wireless subscriber unit comprising:
circuitry configured to transmit packet data in soft handover to a plurality of base stations; wherein the packet data is transmitted using at least one orthogonal code and a pseudo noise (PN) code; wherein the circuitry is further configured to receive a power control command from each of at least two of the base stations such that each power control command from a respective base station is a plurality of bits that indicates one of a plurality of power levels; wherein the circuitry is further configured in response to the received power control commands, to adjust a power level associated with the transmission of the packet data; wherein the power level is a lowest power level indicated by one of the power control commands.

2. The wireless subscriber unit of claim 1 configured to transmit packet data in soft handover to two base stations and to receive the power control commands from the two base stations.

3. A method comprising:
transmitting, by a wireless subscriber unit, packet data in soft handover to a plurality of base stations wherein the packet data is transmitted using at least one orthogonal code and a pseudo noise (PN) code;
receiving, by the wireless subscriber unit, a power control command from each of at least two of the base stations such that each power control command from a respective base station is a plurality of bits indicates one of a plurality of power levels; and
in response to the received power control commands, adjusting, by the wireless subscriber unit, a power level associated with the transmission of the packet data; wherein the power level is a lowest power level indicated by one of the power control commands.

4. The method of claim 3 wherein the wireless subscriber unit transmits packet data in soft handover to two base stations and receives the power control commands from the two base stations.

5. A wireless subscriber unit comprising:
circuitry configured to transmit packet data in soft handover to two base stations; wherein the packet data is transmitted using at least one orthogonal code and a pseudo noise (PN) code; wherein the circuitry is further configured to receive a power control command from each of the base stations such that each power control command is a plurality of bits that indicates one of a plurality of power levels; wherein the circuitry is further configured in response to the received power control commands, to adjust a power level associated with the transmission of the packet data; wherein the power level is a lowest power level indicated by one of the power control commands.

6. A method comprising:
transmitting, by a wireless subscriber unit, packet data in soft handover to two base stations, wherein the packet data is transmitted using at least one orthogonal code and a pseudo noise (PN) code;
receiving, by the wireless subscriber unit, a power control command from each of the base stations such that each power control command from a respective base station is a plurality of bits that indicates one of a plurality of power levels; and in response to the received power control commands, adjusting, by the wireless subscriber unit, a power level associated with the transmission of the packet data; wherein the power level is a lowest power level indicated by one of the power control commands.

* * * * *